United States Patent

Porter

[15] 3,659,684
[45] May 2, 1972

[54] HYDRAULIC LOCK REFILL VALVE

[72] Inventor: Percy L. Porter, Los Angeles, Calif.
[73] Assignee: P. L. Porter Co., Los Angeles, Calif.
[22] Filed: Nov. 25, 1969
[21] Appl. No.: 879,806

[52] U.S. Cl..............................188/322, 141/349, 188/300, 188/315, 251/149.6
[51] Int. Cl..........................................F16f 9/43
[58] Field of Search..............188/322, 315, 300; 251/149.6, 251/149.7; 141/348, 349, 346, 347, 350; 220/86

[56] References Cited

UNITED STATES PATENTS

| | | | |
|---|---|---|---|
| 3,035,617 | 5/1962 | Breitenstein | 141/349 |
| 3,051,274 | 8/1962 | Porter | 188/300 |
| 3,363,518 | 1/1968 | Boissevain | 188/319 X |

Primary Examiner—George E. A. Halvosa
Attorney—Smyth, Roston & Pavitt

[57] ABSTRACT

A refill valve for use in an hydraulic locking device such as that utilized in a chair to control the angle between the backrest and the seat. The refill valve comprises a fluid passageway for refilling the hydraulic locking device, a check valve being mounted within the passageway, having an extension thereon for cooperation with an oil can or other delivery means to open the check valve during refilling and also to allow relief of any over-pressure which may occur during the refilling. Additionally, the refill valve is adjustable within the hydraulic locking device so as to control the override function of the locking valve in the device.

6 Claims, 3 Drawing Figures

INVENTOR:
Percy L. Porter

ATTORNEYS

HYDRAULIC LOCK REFILL VALVE

BACKGROUND OF THE INVENTION

This invention relates to a longitudinally extensible and contractable hydraulic locking device to control the spacing between two members. While the invention is widely applicable for this purpose, it has special utility for controlling the tiltable backrest of a reclining seat, such as that found in aircraft and other vehicles. Such an embodiment of the invention has been selected for the instant disclosure and will provide adequate guidance for those skilled in the art who may have occasion to apply the same principles to other specific purposes.

Devices of this type have been disclosed in U.S. Pat. Nos. 2,559,047, issued July 3, 1951 and 3,051,274, issued Aug. 28, 1962, both of which have been assigned to the assignee hereof. The disclosures of these two patents are hereby incorporated into the present disclosure by reference.

An hydraulic locking device of this type comprises a cylinder confining a quantity of hydraulic fluid and a piston dividing the cylinder into two hydraulic locking chambers, the piston being unitary with the tubular piston rod which extends through both ends of the cylinder. A locking valve controls communication between the two locking chambers and is normally closed so as to immobilize the piston. A heavy external coil spring functions in compression between the cylinder and the piston rod to oppose contraction of the hydraulic locking device. This heavy spring serves to counterbalance and to erect the seat backrest, when used in such an environment.

Space inside the tubular piston rod may be utilized as a reservoir in communication with one of the two hydraulic locking chambers to hold a reserve supply of the hydraulic fluid. Additionally, space surrounding the piston rod may also be utilized as a reservoir for the same purpose. These reservoirs may be adapted to expand and contract to accomodate thermal expansion and contraction of the structure and of the fluid in the two locking chambers.

Although many of the prior art hydraulic locking devices were not provided with a reservoir, the more recent devices have been so provided in order to lengthen the service life of the locking device. The above-described U.S. Pat. No. 3,051,274 illustrates a plurality of embodiments of the reservoir systems which may be provided on the hydraulic locking devices. Such reservoirs have, in fact, greatly extended the service life of the locking device, thereby reducing their maintenance costs as well as reducing the amount of "down time" a vehicle utilizing such locking devices in its seats must undergo for service.

Even when such locking devices have been provided with reservoirs, however, it has been found that the structural components have service lives which far exceed the capabilities of the devices to keep hydraulic fluid within the cylinders and the reservoirs. In most cases, it has been found necessary to disassemble the locking devices, almost to the extent required for a complete overhaul, in order to refill the reservoir and the cylinder. This, of course, requires an undesirable expenditure of both time and labor to accomplish something which, ideally, should take no more than a matter of seconds.

Additionally, when such hydraulic locking devices are used in seats such as those found in airplanes, it is often necessary that the back of the seat be movable to the upright position, without requiring actuation of the locking device control unit. In order to meet such a requirement, it is necessary that the locking valve within the locking device be provided with an override system which will allow such seat adjustment. This feature is well known in the prior art devices and, in some of the devices, the override system is adjustable so as to ensure that a definite force, rather than a mere inadvertent light pressure, is required to move the back of the seat. Most of the prior art override systems which are adjustable have proven to be somewhat difficult to get at for adjustment, thereby also requiring an undesirable expenditure of time and labor.

SUMMARY OF THE INVENTION

In the present invention, a refill valve is positioned within a hydraulic locking device adjacent the end of the device which is fixed to the seat frame. When the pin which fastens the cylinder end of the locking device to the seat frame is removed, the cylinder and the reservoir can be easily refilled, and the override system quickly adjusted.

In order to accomplish refilling of the cylinder and reservoir, a check valve spool is provided within the refill valve; when the fluid injection device is inserted in the now-free end of the locking device, it actuates the check valve spool to a position which will allow hydraulic fluid from the injector to enter the locking device. As a safety feature, when the fluid injector is withdrawn from contact with the check valve spool, a momentary delay in closing the check valve spool occurs, preventing the locking device from being over-pressurized by the fluid injector.

The refill valve also serves as a spring abutment means to control the biasing force exerted on the locking valve of the override system. Provision of a slot in the outer end of the refill valve allows the valve to be axially moved within a threaded opening by a screwdriver inserted into the now-free end of the locking device. Thus, the rotation of the refill valve by a screwdriver will cause an increase or a decrease in the biasing force exerted on the override system.

The provision of a refill valve which will accomplish the two described functions will allow locking device users to service these devices on an interim basis at a very low cost. For example, a mechanic could go through a plane refilling and adjusting the locking devices in each of the seats in a very short time. In the prior art devices, on the other hand, an adjustment of the override system required a lengthy period for each locking device, due to the relative inaccessibility of the adjustment means; refilling the cylinder and reservoir required nearly the same labor, disassembly, and time expenditure as that necessary for a total overhaul of the locking device.

Further advantages of this invention will become obvious to those skilled in the art by reference to the detailed description and accompanying drawings which illustrate one embodiment of what is presently considered to be the best mode contemplated for utilizing the novel principles set forth in the claims.

Even when such locking devices have been provided with reservoirs, however, it has been found that the structural parts thereof have service lives which far exceed the capabilities of the devices to keep hydraulic fluid within the locking cylinders and the reservoir. In an effort to extend the total service life of the locking devices still further, the present invention provides structure which, when utilized in a locking device with or without a reservoir, allows the locking device to be refilled with hydraulic fluid without requiring the expenditure of large amounts of time and money.

In utilizing hydraulic locking devices in seats such as those found in aircraft, it is sometimes desirable that the back of the seat be movable to the upright position without requiring actuation of the locking device control unit. In such applications, it is necessary that the locking valve within the locking device be provided with an override system which will allow such seat adjustment. On the other hand, it is also desirable that the override system be adjusted so that a definite force is required to move the back of the seat, rather than mere inadvertent light pressure.

It is therefore an object of this invention to provide an adjustment means for the override system of the locking valve, which may be easily adjusted.

It is also an object of this invention to provide such an adjustment means as a part of the refill valve so as to minimize the structure necessary to accomplish the functions of the invention.

It is also an object of this invention to provide an apparatus which will allow hydraulic fluid refilling and override adjustment with a minimum amount of time and effort.

Other objects, advantages, modes, and embodiments of this invention will become obvious to those skilled in the art by reference to the detailed description and accompanying drawings which illustrate what is presently considered to be the preferred embodiment of the best mode contemplated for utilizing the novel principles set forth in the claims.

DETAILED DESCRIPTION

Figure 1:
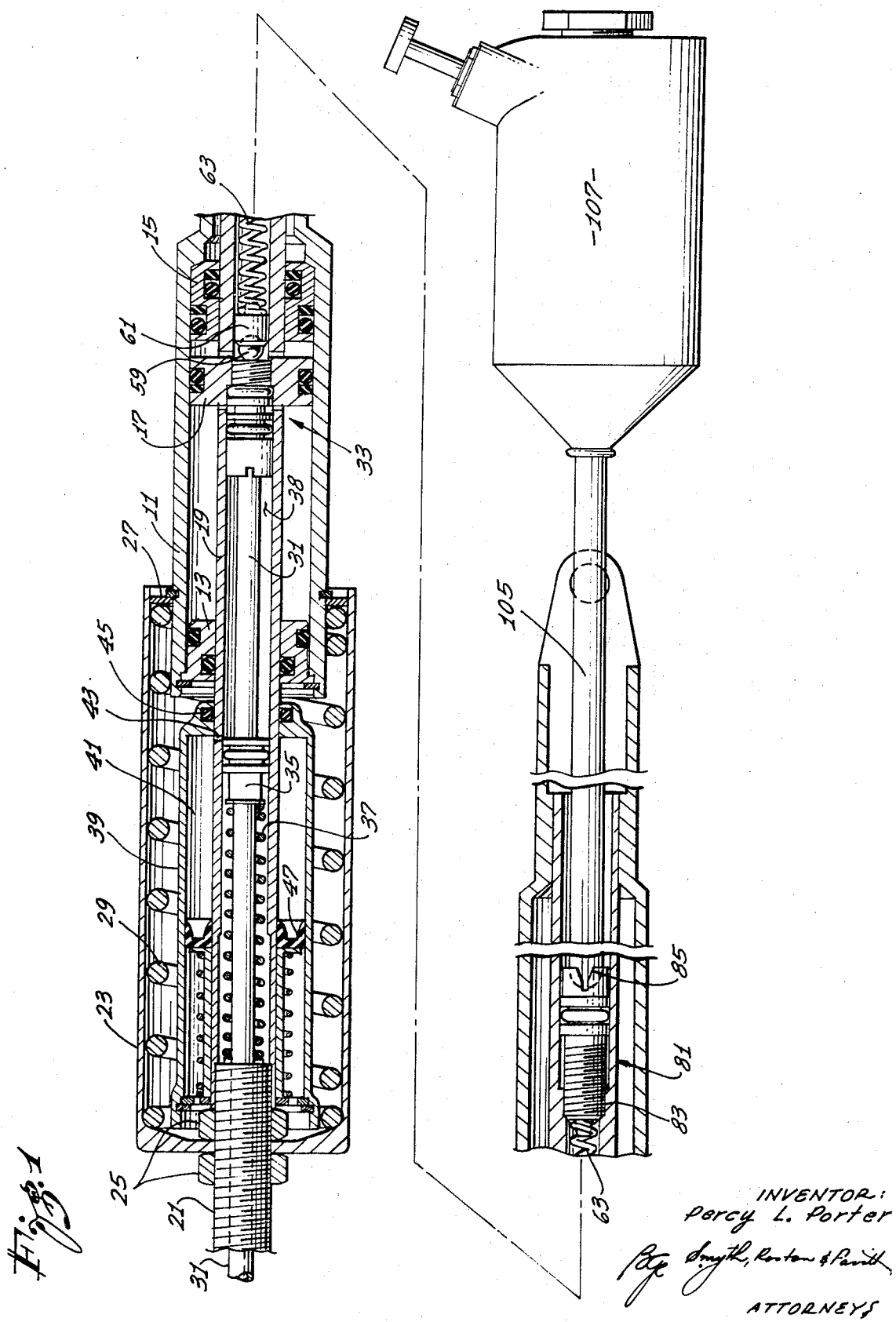
FIG. 1 is a longitudinal sectional view of an hydraulic locking device utilizing the principles of the present invention.

Referring now to FIG. 1, there is illustrated, in cross section, an embodiment of an hydraulic locking device which can utilize concepts of the present invention. Basically, the locking device comprises a housing 10 which includes a cylinder 11 having end walls 13 and 15, between which a piston 17 is movably mounted on a tubular piston rod 19 which extends through both of the cylinder end walls and is axially movable relative to the housing. A threaded member 21 is attached to the left end of the piston rod 19 for securing one end of the locking device to the tiltable back of a seat (not shown). A cylindrical guard 23 is fastened to the threaded member 21 by a pair of cooperating nuts 25. Acting between the cylindrical member 23 and a set of fastening rings 27, a heavy counterbalancing coil spring 29 biases the piston 17 toward the left within cylinder 11 to oppose contraction of the piston into the cylinder, i.e., the position shown in FIG. 1. Thus, FIG. 1 illustrates the locking device in the fully contracted position attained at the maximum angle of tilt of the back of the seat.

A rod member 31, operated by an actuating means which is not shown, slidably extends through the threaded member 21 and the piston rod 19 to actuate a locking-check valve generally illustrated at 33. A gland or seal member 35 is mounted on the rod 31 and biased toward a stop means, not shown, by a spring 37. The tubular volume between the rod 31 and the piston rod 19, extending from the locking valve 33 to the gland 35, forms a passage.

A second cylinder 39 is mounted on the piston rod 19, and the volume 41 within that cylinder forms a reservoir which is in communication with passage 38 via an aperture 43 in the piston rod. Suitable sealing means 45 and 47 are provided to prevent leakage from reservoir 41. Communication between the passage and reservoir may be restricted to protect the reservoir from momentary fluid pressure surges in passage 38, if desired, by providing a very small clearance between the position of gland 35 against its stop and the aperture 43.

Figure 2:
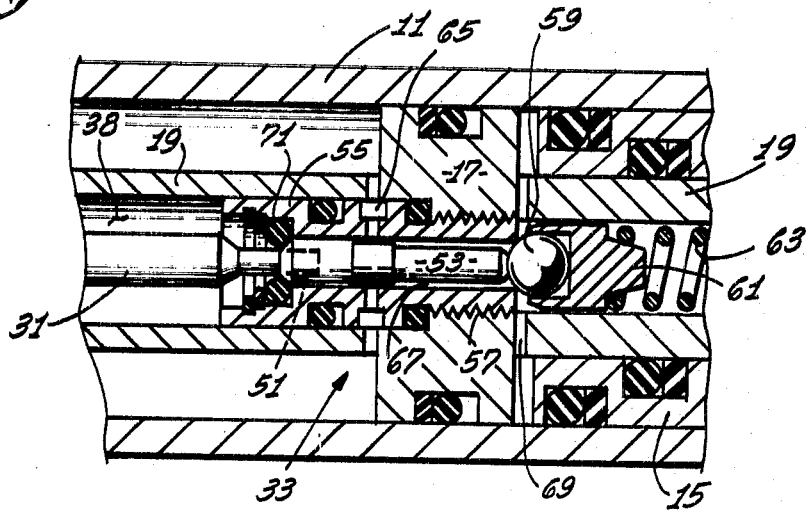
FIG. 2 is a fragmentary longitudinal sectional view of the piston assembly of the locking device of FIG. 1, including the locking valve and the check valve.

The locking-check valve 33 is illustrated in cross sectional detail in FIG. 2. As shown, the actuating rod 31 has an end portion of reduced size which extends into a socket 51 in the large diameter section of a check valve spool 53. The check valve spool is axially movable within a valve body 55 which is positioned within the tubular piston rod 19 and is fastened to the piston 17 at threaded section 57. The valve body 55 also provides a seat for a locking valve ball member 59 which is actuated against the seat by a guide member 61 under the biasing force of a spring 63.

Locking ball 59 may be moved, against the force of spring 63, away from its seat in the valve body by axial movement of operating rod 31 which is transmitted to the ball through the check valve spool 53. When this occurs, hydraulic fluid may pass from one side of piston 17 to the other via radial passage 65 in the piston rod and valve body, axial passage 67 around the check valve spool, the opening between the valve body seat and the locking valve ball 59, and radial passage 69 in the piston rod.

As stated previously, it occasionally happens that someone will move the back of the seat to the upright position without first causing the actuation of operating rod 31. Recalling that, in the maximum tilt position of the seat back, the piston 17 is in the position illustrated in FIGS. 1 and 2, movement of the seat back toward the upright position would cause piston 17 to tend to move toward the left in those figures. The increase in pressure on the left-hand side of the piston 17 will cause the ball 59 to move away from its seat on valve body 55, allowing passage of fluid from the left-hand side of the piston to the right-hand side. This feature in such locking devices is known as an "override".

When the valve spool 53 is sufficiently actuated by the operating rod 31, a tapered portion of the large diameter section of the spool will become separated from an O-ring 71, thereby allowing communication of hydraulic fluid from the passage 38 to the axial passage 67 which surrounds the valve spool. Therefore, when sufficient actuation occurs, the reservoir will replenish the supply of hydraulic fluid in the cylinder. Since passage 38 is connected to reservoir 41 via aperture 43, the amount of replenishment fluid available to service the cylinder is relatively large.

Figure 3:
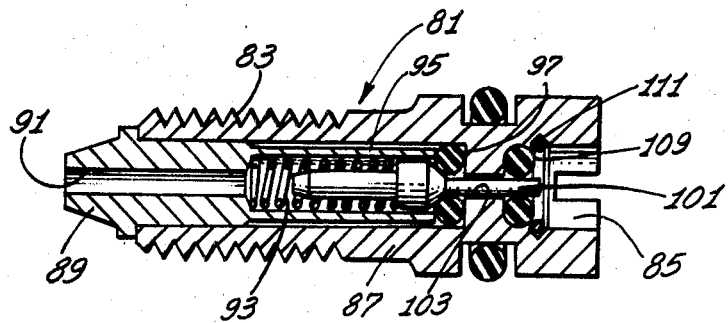
FIG. 3 is a longitudinal sectional view of the refill valve according to the present invention.

Referring now to FIGS. 1 and 3, it is seen that spring 63, which acts against guide member 61 to hold the locking valve ball against its seat, also abuts against a refill valve member 81 which is adjustably positioned within the tubular piston rod 19 by threaded means 83. The refill valve also has a slotted section 85 so that the valve may be turned relative to the piston rod during installation and also to adjust the compression force exerted on the locking valve by spring 63. Thus, the override function described above can easily be regulated and controlled by the distance which the refill valve 81 is installed in the piston rod.

With particular reference to FIG. 3, it can be seen that the refill valve 81 comprises a valve body 87 into which a spring guide 89, having a longitudinal passage 91 therethrough, is immovably fitted. The spring guide serves to bias a spring 93 against a valve spool 95 to urge the valve spool into contact with an O-ring seal 97, thereby closing the valve as shown in FIG. 3. A section 101 of the valve spool extends through an aperture 103 in an internal flange in the valve body 87. When a tubular section 105 of an hydraulic fluid injection member 107 presses against the section 101, while moving toward a position in which it becomes sealed against an O-ring 109, held in place by a spring ring 111, the spool 95 moves against the force of spring 93 and away from the O-ring 97 so that fluid may be injected into the passage 91 via the aperture 103.

The injected hydraulic fluid passes about the guide 61 and into the area of the cylinder to the right of piston 17. When the pressure on that side of the piston becomes sufficiently great, ball 59 will move away from its seat and additional fluid will pass to the area of the cylinder on the left of piston 17. Alternatively, if the operating rod 31 is actuated to its maximum position when hydraulic fluid is being injected, the ball 59 will be moved away from its seat in the manner previously described and fluid will pass the check valve spool 53 and flow through passage 38 to reservoir 41, thereby replenishing the hydraulic fluid supply of the locking device.

Suitable extension of member 101 beyond aperture 103 will ensure that the spool 95 is not sealed against O-ring 97 immediately upon removal of the injector from contact with O-ring 109. This results in a momentary delay in closing the refill valve, preventing the operator of the injector from putting too much fluid into the locking device. Any over-pressure of the system will leak past the O-rings 97 and 109 during the momentary delay.

Alternatively, in applications in which overfill is of no importance or in which the insertion pressure is controlled, the valve spool 95 could be replaced by any suitable check means, such as a ball check which would be opened by injection of oil through the valve 81 from a fluid source or contact with the injection device.

Thus, the applicant has provided an illustration of one embodiment of a new and improved concept in the art of hydraulic locking devices.

Many modifications and alterations of that embodiment will be obvious to those skilled in the art, wherefore, what is claimed as the invention is:

1. In a hydraulic device comprising a housing containing a cylinder which is divided into two chambers by a piston mounted on a tubular piston rod and having a first valve therein for controlling the flow of fluid between said chambers, a fluid reservoir, and a second valve selectively placing at least one of said chambers into communication with said fluid reservoir, the improvement comprising:
   a normally closed third valve so mounted within said tubular piston rod as to cause fluid delivered thereto from a source other than said hydraulic device to be communicated via said tubular piston rod to at least one of said chambers and comprising
   a valve body,
   a first seal means in said valve body,
   a second seal means in said valve body
   a valve closing means in said valve body having an actuating extension on one end thereof,
   means for biasing said valve closing means into sealing contact with said first seal means so that said actuating extension extends through and beyond said second seal means without causing sealing contact therewith.

2. The apparatus of claim 1 including
   means in said third valve for adjusting the amount of force required to open said first fluid flow controlling valve.

3. In a hydraulic device, the combination of
   a tubular member,
   a pair of end walls in said tubular member forming a cylinder therebetween,
   a piston mounted for movement within said cylinder,
   a piston rod fixed to said piston for movement of said piston within said cylinder,
   a fluid reservoir operatively associated with said tubular member,
   a check valve mounted within said piston rod for selectively connecting said reservoir and said cylinder,
   a flow valve means mounted within said piston rod for allowing flow of fluid within said cylinder from one side of said piston to the other when said piston is moved within said cylinder,
   a fill valve means mounted within said piston rod and having means for receiving a fluid injection means,
      means normally closing said fill valve means against the passage of fluid therethrough,
      means for opening said fill valve in response to reception of a fluid injection means in said receiving means for injection of fluid from the fluid injection means to said cylinder and for allowing reverse flow of fluid from said cylinder through said fill valve after the fluid injection means stops injecting fluid therethrough and is being withdrawn, and
   passage means connecting said fill valve means with said cylinder.

4. The device of claim 3 including
   means in said fill valve means for sealing the latter to a fluid injection means inserted into said receiving means to prevent fluid flow from such an injection means except through said fill valve means.

5. The device of claim 3 wherein
   a fluid passage formed within said piston is provided with means for receiving said flow valve which normally closes said fluid passage,
   said fill valve including
      means for controlling the force exerted by said flow valve for sealing said fluid passage.

6. The device of claim 3 wherein
   said piston rod is a tubular rod, and has formed therein
      the fluid reservoir, and
      means for actuating said flow valve to form a temporary communication between said fluid reservoir and said cylinder.

* * * * *